(No Model.)

W. D. TABER.
CHECK REIN HOLDER.

No. 325,285. Patented Sept. 1, 1885.

WITNESSES:
Otto Berger
C. Sedgwick

INVENTOR:
W. D. Taber
BY Munn & Co
ATTORNEYS.

UNITED STATES PATENT OFFICE.

WILLIAM D. TABER, OF ROCKVILLE, RHODE ISLAND, ASSIGNOR TO HIMSELF AND CLARK A. TABOR, OF SAME PLACE, AND JOHN A. COVEY, OF HOPE VALLEY, RHODE ISLAND.

CHECK-REIN HOLDER.

SPECIFICATION forming part of Letters Patent No. 325,285, dated September 1, 1835.

Application filed January 13, 1885. (No model.)

*To all whom it may concern:*

Be it known that I, WILLIAM D. TABER, of Rockville, in the county of Washington and State of Rhode Island, have invented a new and Improved Check-Rein Holder, of which the following is a full, clear, and exact description.

My invention relates to check-rein holders or water-hooks of harness; and it has for its object to provide a simple, inexpensive, and efficient check-rein holder, by which a horse may be checked higher or lower or unchecked by operating a single strap or line from the vehicle.

The invention consists in a check-rein holder comprising a frame, a clamping device arranged to clamp the check-strap in a space between itself and the frame, and said frame having a side space or slot communicating with the space in which the check-strap is clamped.

The invention consists, also, in particular constructions and combinations of the check-rein holder, all as hereinafter fully described and claimed.

Reference is to be had to the accompanying drawings, forming part of this specification, in which similar letters of reference indicate corresponding parts in both the figures.

Figure 1:
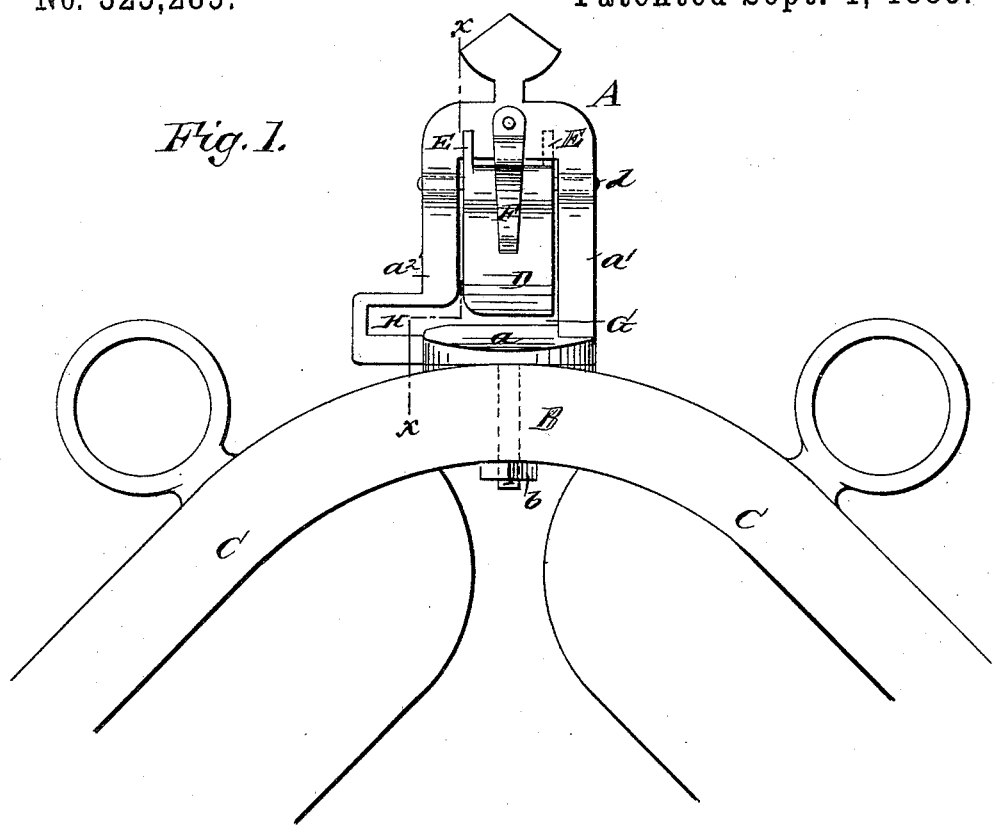
Figure 2:
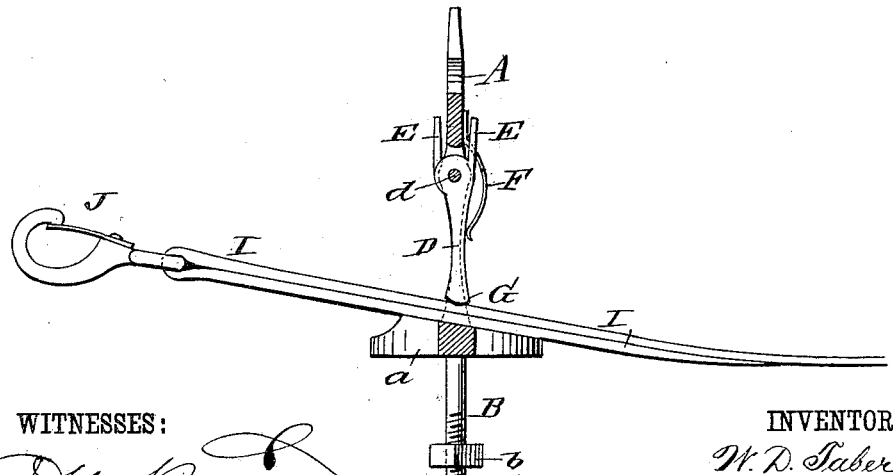

Figure 1 is a rear view of my improved check-rein holder as applied to a harness-saddle, and Fig. 2 is a side elevation of the holder in section on the line $x$ $x$, Fig. 1, with the check-rein strap secured in the holder.

The letter A indicates the frame or body portion of the rein-holder, the base-piece $a$ of which has a screw or bolt end, B, fixed to it, by means of which and the nut $b$ the holder may be firmly fixed to the crest of the saddle C of the harness between the terrets, as in Fig. 1.

D is a clamping-plate, which is pivoted on a pin, $d$, so as to swing between the side bars, $a'$ $a^2$, of the frame A, and has lips or projections E E, which strike against opposite faces of the head of the frame A, to limit the swinging of the plate both ways.

F is a spring fixed to the head of frame A and bearing on the back of the plate D, to force it forward at its lower end, which stands above the downwardly and rearwardly inclined upper face of the base-piece $a$, to leave a space, as at G, between the plate D and base-piece $a$ of about the thickness of the strap I, or a little less, so that a forward pull on the strap will bind it fast in the space G.

The strap I has at its forward end the snap-hook J, into which the bight or loop of the check-rein will be passed, and said strap extends backward within reach of the driver or occupant of the buggy or vehicle drawn by the horse.

As seen best in Fig. 1, the side bar $a'$ of the frame A connects directly with the base-piece $a$ of the frame; but the opposite side bar, $a^2$, is bent outward laterally, then downward, and then inward laterally, to connect with the base-piece $a$, whereby is formed the space or opening H in the frame A about in line with the space G, in which the strap I normally is clamped.

It is evident when the check-rein (not shown) is connected with the snap-hook J of the auxiliary check-strap I, held in the vehicle, and when the strap is clamped in the space G between the plate D and the base $a$ of the frame A, that by pulling back on the strap I more or less the plate D will be swung backward to free the strap, which, when released, will be clamped almost instantly by the plate, so as to check the horse higher, and when it is desired to uncheck the horse it only is necessary to pull back slightly on the strap I to release it from the plate D, when by slipping the strap to one side it will be entered into the slot or space H, through which it can move freely, thus allowing the animal to drink or graze, and by drawing the strap I backward more or less and slipping it over laterally into the space G it may again be clamped to check the horse at any desired height.

It will be seen that with my holder the animal may be checked at any desired height or unchecked by operating the single strap I, and without requiring the occupant of the vehicle to alight, thereby promoting the safety and increasing the pleasure of driving.

Having thus described my invention, what I claim as new, and desire to secure by Letters Patent, is—

1. A check-rein holder comprising a frame, a clamping device arranged to clamp the check strap or rein in a space between said clamping device and the frame, and said frame having a side space or slot for receiving a check rein or strap communicating with the space in which the strap or rein is clamped, substantially as herein set forth.

2. A check-rein holder comprising a frame, a pivoted plate clamping the check strap or rein in a space between said plate and the base-plate of the frame, and said frame having a side space or slot for receiving a check rein or strap communicating with the space in which the check-strap is clamped, substantially as herein set forth.

3. The combination, in a check-rein holder, of a frame, a clamping device arranged to clamp the check-strap between itself and the frame, and said frame having a side space or slot for receiving a check rein or strap communicating with the space in which the strap is clamped, and said strap being adapted for connection to the check-rein and extended backward to the vehicle, substantially as herein set forth.

4. The combination, in a check-rein holder, of a frame, A, pivoted clamp-plate D, provided with stops E E and spring F, said frame A being formed to provide a strap-space, G, and a communicating space or slot, H, substantially as herein set forth.

5. The combination, in a check-rein holder, of a frame, A, provided with a strap-space, G, and a communicating space or slot, H, pivoted clamp plate D, spring F, stops E E, and the checking-strap I, adapted for connection to the check-rein and extended to the vehicle, substantially as herein set forth.

WILLIAM D. TABER.

Witnesses:
HERMAN F. SMITH,
CHRISTOPHER P. LILLIBRIDGE.

It is hereby certified that the name of one of the assignees in Letters Patent No. 325,285, granted September 1, 1885, upon the application of William D. Taber, of Rockville, Rhode Island, for an improvement in "Check-Rein Holders," was erroneously written and printed "John A. Covey," whereas the name of said assignee should have been written and printed *John A. Corey;* and that the said Letters Patent should be read with this correction therein that the same may conform to the record of the case in the Patent Office.

Signed, countersigned, and sealed this 24th day of November, A. D. 1885.

[SEAL.]

H. L. MULDROW,
                *Acting Secretary of the Interior.*

Countersigned:
 M. V. MONTGOMERY,
  *Commissioner of Patents.*